CRYOGENIC ASSOCIATIVE MEMORY

Filed Feb. 8, 1966 7 Sheets-Sheet 1

| METHOD | CYCLE | DATA INTERROGATION | DATA INTERROGATION | SENSE OUTPUT | WORDS SENSED |
|---|---|---|---|---|---|
| (a) FREI & GOLDBERG | 1 | Ø Ø Ø Ø Ø | | 1 | 1, 2, 3 |
| | 2 | 0 Ø Ø Ø Ø | | 1 | 1 |
| | 3 | 0 0 Ø Ø Ø | | 1 | 1 |
| | 4 | 0 0 0 Ø Ø | | 1 | 1 |
| | 5 | 0 0 0 0 Ø | | 1 | 1 |
| | 6 | 0 0 0 0 0 | | 0 | |
| | 7 | 0 0 0 0 1 | | 1 | 1* |
| | 8 | 0 0 0 1 Ø | | 0 | |
| | 9 | 0 0 1 Ø Ø | | 0 | |
| | 10 | 0 1 Ø Ø Ø | | 0 | |
| | 11 | 1 Ø Ø Ø Ø | | 1 | 2, 3 |
| | 12 | 1 0 Ø Ø Ø | | 1 | 2 |
| | 13 | 1 0 0 Ø Ø | | 1 | 2 |
| | 14 | 1 0 0 0 Ø | | 1 | 2 |
| | 15 | 1 0 0 0 0 | | 1 | 2* |
| | 16 | 1 0 0 0 1 | | 0 | |
| | 17 | 1 0 0 1 Ø | | 0 | |
| | 18 | 1 0 1 Ø Ø | | 0 | |
| | 19 | 1 1 Ø Ø Ø | | 1 | 3 |
| | 20 | 1 1 0 Ø Ø | | 0 | |
| | 21 | 1 1 1 0 Ø | | 0 | |
| | 22 | 1 1 1 1 0 | | 1 | 3* |
| | 23 | 1 1 1 1 1 | | 0 | |
| (b) PLURALITY SENSE | 1 | Ø Ø Ø Ø Ø | | P | 1, 2, 3 |
| | 2 | 0 Ø Ø Ø Ø | | 1 | 1 |
| | 3 | 0 0 Ø Ø Ø | | 1 | 1 |
| | 4 | 0 0 0 0 0 | | 1 | 1 |
| | 5 | 0 0 0 0 Ø | | 1 | 1 |
| | 6 | 0 0 0 0 0 | | 0 | |
| | 7 | 0 0 0 0 1 | | 1 | 1* |
| | 8 | 1 Ø Ø Ø Ø | | P | 2, 3 |
| | 9 | 1 0 Ø Ø Ø | | 1 | 2 |
| | 10 | 1 0 0 Ø Ø | | 1 | 2 |
| | 11 | 1 0 0 0 Ø | | 1 | 2 |
| | 12 | 1 0 0 0 0 | | 1 | 2* |
| | 13 | 1 1 Ø Ø Ø | | 1 | 3 |
| | 14 | 1 1 0 Ø Ø | | 0 | |
| | 15 | 1 1 1 0 Ø | | 0 | |
| | 16 | 1 1 1 1 0 | | 1 | 3* |
| (c) LEWIN | 1 | Ø Ø Ø Ø Ø | | X X X X X | 1, 2, 3 |
| | 2 | 0 Ø Ø Ø Ø | | 0 0 0 0 1 | 1* |
| | 3 | 1 Ø Ø Ø Ø | | 1 X X X 0 | 2, 3 |
| | 4 | 1 0 Ø Ø Ø | | 1 0 0 0 0 | 2* |
| | 5 | 1 1 Ø Ø Ø | | 1 1 1 1 0 | 3* |
| (d) MODIFIED LEWIN | 1 | Ø Ø Ø Ø Ø | 0 0 0 0 0 | 0 0 0 0 0 | 1, 2, 3 |
| | 2 | Ø Ø Ø Ø Ø | 1 1 1 1 1 | 1 1 1 1 1 | |
| | 3 | 0 Ø Ø Ø Ø | 0 0 0 0 | 0 0 0 N | 1* |
| | 4 | 0 Ø Ø Ø Ø | 1 1 1 1 | N N N 1 | |
| | 5 | 1 Ø Ø Ø Ø | 0 0 0 0 | 0 0 0 0 | 2, 3 |
| | 6 | 1 Ø Ø Ø Ø | 1 1 1 1 | 1 1 1 N | |
| | 7 | 1 0 Ø Ø Ø | 0 0 0 | 0 0 0 | 2* |
| | 8 | 1 0 Ø Ø Ø | 1 1 1 | N N N | |
| | 9 | 1 1 Ø Ø Ø | 0 0 0 | N N 0 | 3* |
| | 10 | 1 1 Ø Ø Ø | 1 1 1 | 1 1 N | |

EXAMPLE: 5 DATA BITS 3 WORD RETRIEVAL

DATA BITS OF WORD (1) 0 0 0 0 1
(2) 1 0 0 0 0
(3) 1 1 1 1 0

Fig. 1

P = PLURALITY
N = NOT 1 FOR A 1 INTERROGATE OR NOT 0 FOR A 0 INTERROGATE
* = A RETRIEVED WORD

INVENTOR.
RICHARD W. AHRONS
BY Philip Schneider
Lonnie B. Cozzolato
ATTORNEYS

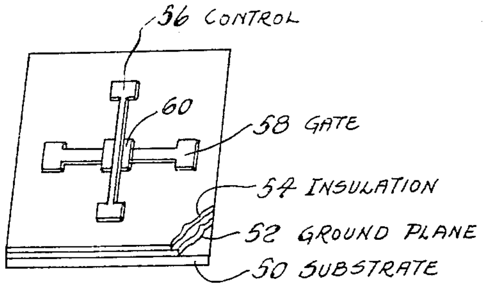
Fig. 2
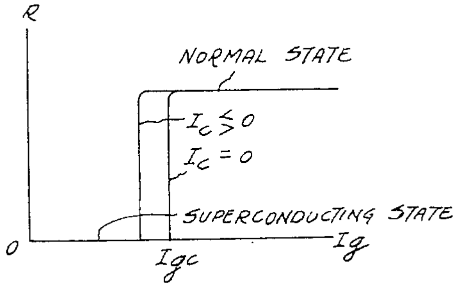
Fig. 3
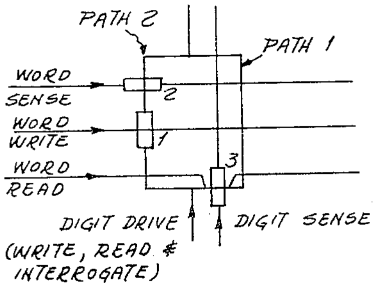
Fig. 4
| INTERROGATE | STORE | WORD SENSE (CURRENT IN PATH 2) |
|---|---|---|
| 0(−I) | 0($-I_s$) | 0(0) |
| 1 (I) | 0($-I_s$) | 1($-2I_s$) |
| 0 (−I) | 1($I_s$) | 1($2I_s$) |
| 1 (I) | 1($I_s$) | 0(0) |
| ∅(0) | 0($-I_s$) | 0($-I_s$) |
| ∅(0) | 1($I_s$) | 0($I_s$) |
Fig. 5
INVENTOR.
RICHARD W. AHRONS
BY Philip Schneider
Louis B. Applebaum
ATTORNEYS INVENTOR
RICHARD W. AHRONS
BY Philip Schneider
Lorin B. Applebaum
ATTORNEYS

CRYOGENIC ASSOCIATIVE MEMORY

Filed Feb. 8, 1966

INVENTOR.
RICHARD W. AHRONS
BY Philip Schneider
Louis B. Applebaum
ATTORNEYS

CRYOGENIC ASSOCIATIVE MEMORY

Filed Feb. 8, 1966

INVENTOR.
RICHARD W. AHRONS
BY Philip Schneider
Louis B. Applebaum
ATTORNEYS

INVENTOR.
RICHARD W. AHRONS
BY Philip Schneider
Louis B. Applebaum
ATTORNEYS

CRYOGENIC ASSOCIATIVE MEMORY

INVENTOR.
RICHARD W. AHRONS
BY Philip Schneider
Louis B. Applebaum
ATTORNEYS

United States Patent Office 3,483,532
Patented Dec. 9, 1969

3,483,532

CRYOGENIC ASSOCIATIVE MEMORY

Richard W. Ahrons, Somerville, N.J., assignor, by mesne assignments, to the United States of America as represented by the Secretary of the Navy Filed Feb. 8, 1966, Ser. No. 526,330
Int. Cl. G11b 9/00, 13/00; G06f 1/00
U.S. Cl. 340—173.1 9 Claims

ABSTRACT OF THE DISCLOSURE

A content-addressed memory using a Lewin-type readout organization and having a cryogenic address section associated with each word organization, the address section comprising circuit means for adding a plurality of $q$ address bits to each word organization and means for permanently writing, into the $q$ address bits of each word organization, information constituting the address code of the word associated with that word organization. The address section can further include a register of $q$ bits associated with the address bits of all word organizations for storing the address of the next empty word location.

This invention relates to cryogenic associative memories and especially to associative memories using a sequentially addressed write (SAW) process or, alternatively, a sequentially interrogated ladder (SIL) for writing.

It is to be noted that the terms "associative memory" and content-addressed memory (CAM) are synonymous.

In most present day computers, the random-access memory such as magnetic-core memory has replaced the serial-access memory such as the magnetic-drum memory or the discs memory as the internal memory in the computer. Random-access memories have not as yet replaced the magnetic tape in semipermanent external stores because of the economics of size indicated by the cost-per-bit. Superconductive random-access memories appear to have commercial promise in lowering the cost-per-bit and increasing the capacity of the computer memory. The next step in basic memories may be the more intelligent associative memory, as contrasted to the serial-access memory which employ a serial scan for the appropriate data, and the random-access memory which employs an address to locate the data.

A large percentage of programming time and effort is usually spent in assigning and keeping track of addresses. As far as is known, the human memory allows information to be retrieved by an associative process without regard for physical location of information. With these two points in mind, the conventional technique of requiring an address for each physical word location may be neither the most natural nor the most convenient for storing information. Associative memories should not be misconstrued as an attempt to extend the random-access memory process since it eliminates the address and the bookkeeping of the addresses. Thus, the associative memory concept should lead to a change in the philosophy of memory programming and not merely an extension of present techniques. It is reasonable to believe that associative form of memories will be applicable to future computers which are intended for the more sophisticated learning and thinking processes.

The basic function of an associative memory (alternatively called catalog, parallel-search, content-addressed or data-addressed memory) could be defined as a memory with the ability to answer this question: Is this piece of information in the memory? Since this interrogation information is already known, the information generally desired is that which is associated with the original interrogating information. Thus, the memory which only answers the above question is the most elementary form of associative memories. The more advanced forms of associative memories have been divided into four categories:

(1) The fixed tag associative memory has one fixed segment of the word set aside for interrogation and all of that segment must be used in the interrogation. The remainder of the word is read as the desired information. Thus, only a part of the memory is associative.

(2) A multiple fixed tag associative memory is one whose words are divided into segments any of which can be used as the interrogated portion. All the bits in the interrogated segment must be used in the interrogation.

(3) A variable tag associative memory uses only a fixed segment of the word used for the interrogation. Any part of this fixed segment may be employed in the interrogation. Only a part of this memory is associative.

(4) The fully interrogable memory allows any choice of bits in the word to be used in the interrogation and the remainder of the word is read. This is the most general form of the associative memory. All following discussion will be related to this form.

The objects and advantages of the present invention are accomplished by adding a set of address bits to each word in an associative memory designed for Lewin-type readout, the added set of bits constituting a permanent fixed address for that word.

An object of this invention is to facilitate the finding of an empty word location in an associative memory designed for Lewin-type readout when it is desired to write a word into the memory.

Another object is to permit each word location to be labeled with a permanent fixed address so that, when an empty word location is found, its address is also determined.

A further object is to permit the write-in process to be performed in a cryogenic associative memory designed for Lewin-type readout without the necessity for using extra word-logic circuitry.

Other objects and many of the attendant advantages of this invention will be readily appreciated at the same becomes better understood by reference to the following detailed description when considered in connection with the accompanying drawings wherein:

FIG. 1 is a table subdivided into four subsections *a, b, c* and *d* giving examples of four methods for ordered word retrieval from a memory;

FIG. 2 is a representation of the physical structure of a crossed-film cryotron;

FIG. 3 is a curve showing the manner in which the resistance of a cross-film cryotron varies with its gate current;

FIG. 4 is a schematic of a cryotronic cell which can be used with an associative memory;

FIG. 5 is a truth table for the associative memory cell of FIG. 4;

Figure 15:
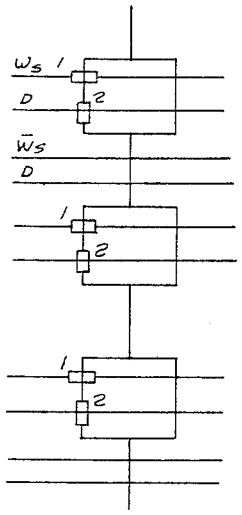
Figure 16:
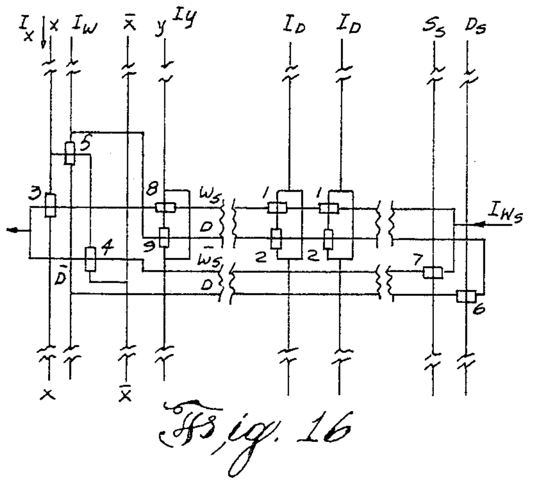
Figure 17:
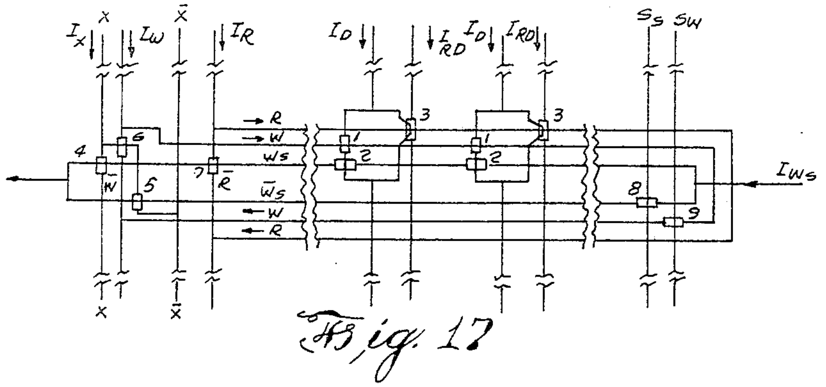
Figure 18:
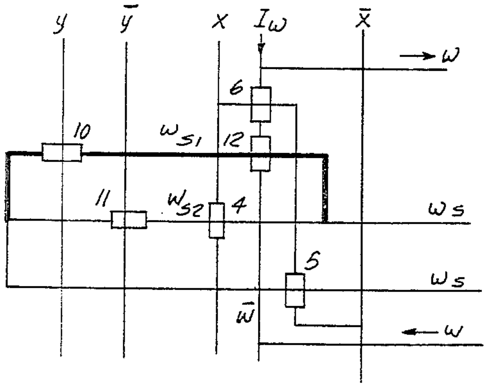
Figures 19, 20:
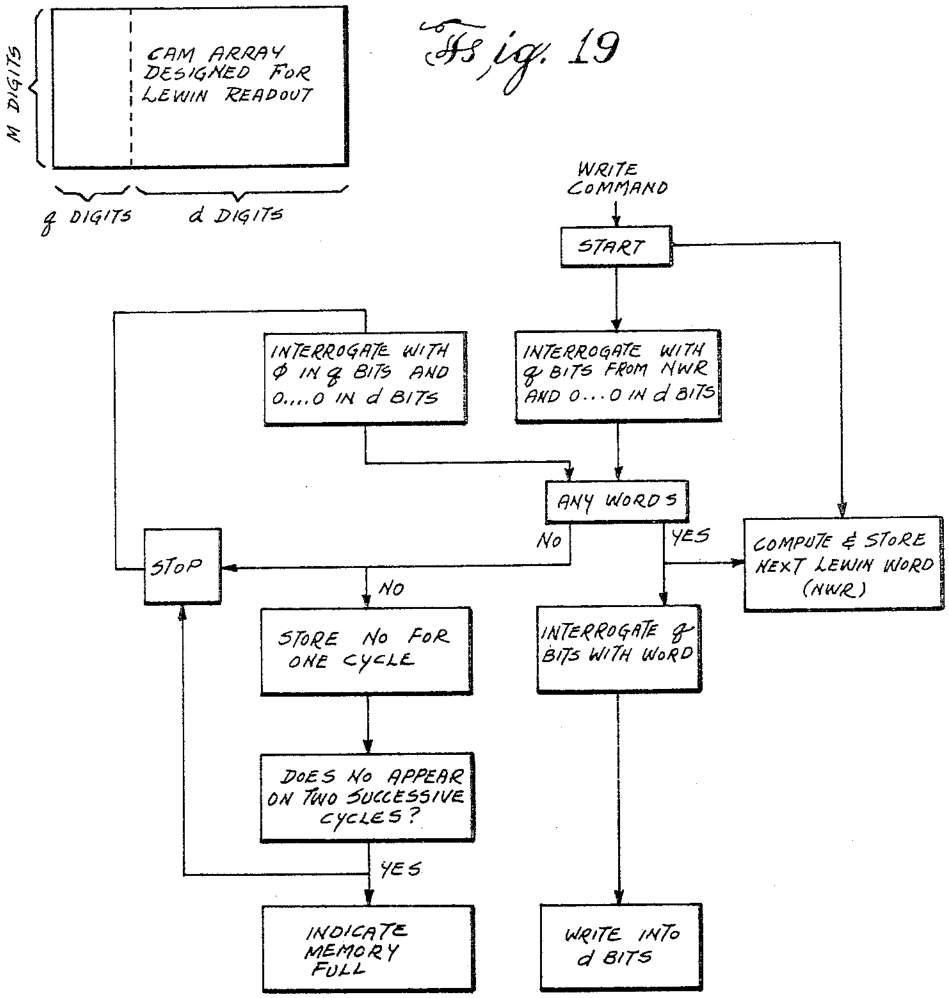
Figure 21:
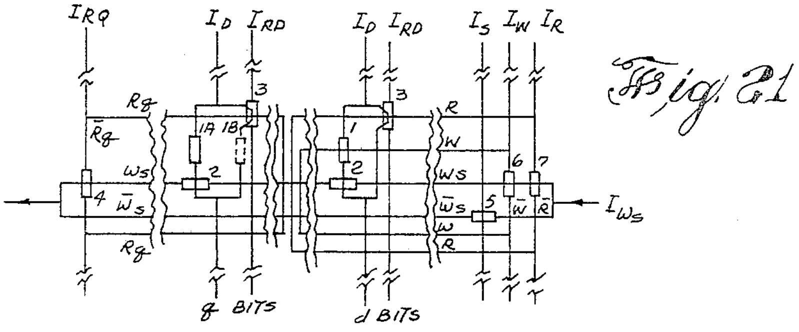
Figure 23:
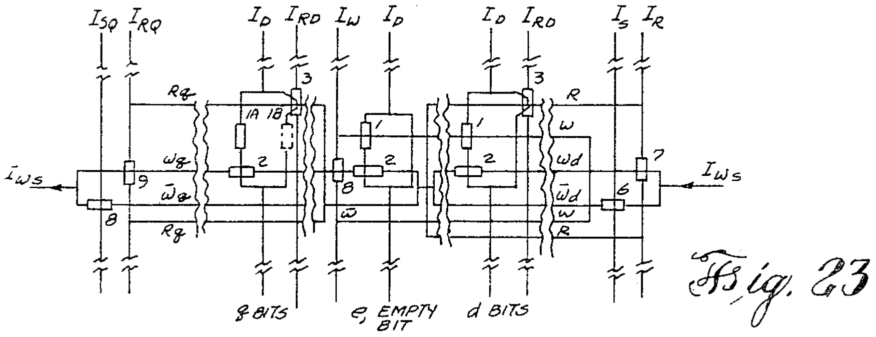
Figure 24:
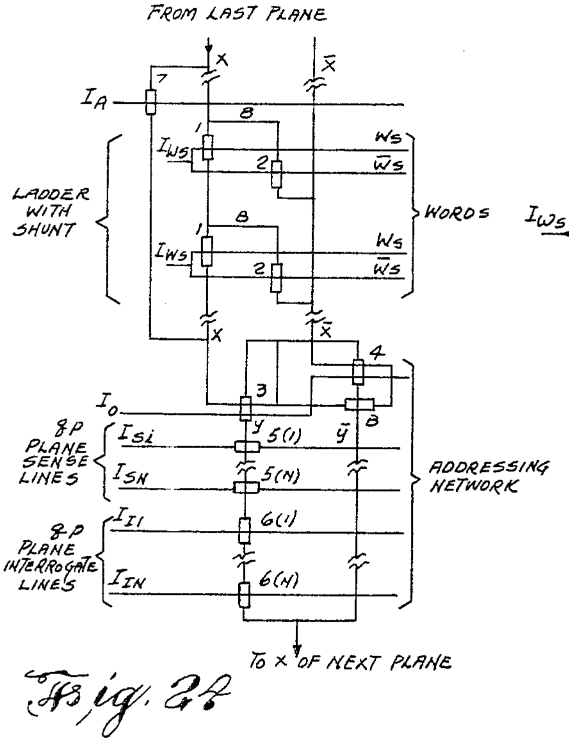
Figure 22:
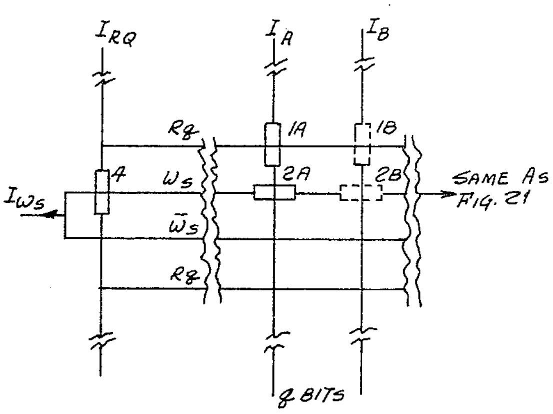

FIGS. 13*a* and *b* are schematic diagrams of alternative series read or write networks;

FIG. 14*a* is a schematic diagram of a sequencing circuit with a parallel set of cryotrons;

FIG. 14*b* is a schematic diagram of a sequencing circuit with a single cryotron;

FIG. 15 is a schematic diagram of a sequencing digit circuit;

FIG. 16 is a schematic diagram of the circuit of an associative memory word with parallel readout;

FIG. 17 is a schematic diagram of an associative memory word with modified Lewin readout;

FIG. 18 is a schematic diagram of a rapid destroy circuit;

FIG. 19 is a block diagram illustrating the organization of an associative memory;

FIG. 20 is a flow diagram illustrating the sequentially addressed write (SAW) process;

FIG. 21 is a schematic diagram of a cryotronic circuit for one word of an associative memory using $q$ bits;

FIG. 22 is a schematic diagram of an alternate cryotronic circuit for one word of an associative memory using $q$ bits;

FIG. 23 is a schematic diagram of a cryotronic circuit for one word of an associative memory with an empty bit; and FIG. 24 is a schematic diagram of a circuit which can be used for addressing a plane in the SIL process.

I. SUPERCONDUCTIVE ASSOCIATIVE MEMORIES

A. Memory readout

The desired information, i.e., that contained in other than the interrogated portion of the word which is called the data portion, may be read from the memory in serial (bit by bit) or parallel (all bits in a word) depending on the design. A superconductive associative memory described by Slade uses a serial read. This memory was of the fully interrogable type, which permits any choice of bits in the word to be used in the interrogation and the remainder of the word to be read. One portion or segment of this memory was interrogated and a sensing signal, which was a voltage in this case, appeared if there was a match present in the memory. After finding a match, the first digit of the data portion of the word is interrogated with a 1 along with the original interrogating segment. If a match is present, then the new bit is known to be a 1. If a match is not present, the bit is obviously a 0. With this known piece of information, the next unknown bit is interrogated with a 1. This procedure is repeated serially until all bits are known. It is assumed, in this procedure, that the interrogated word segment appears only with respect to one word in the memory.

Frei and Goldberg have shown that the associative memory described by Slade can be used when more than one word contains the interrogated word segment (henceforth termed "multiple responses"). All the data can be retrieved in serial fashion using the algorithms of Frei and Goldberg. This method permits retrieval of all data in ordered serial form. The words may be retrieved beginning with either the highest number or the lowest number. An example of this method showing the retrieval of three words when the data portion of the word has 5 bits is given in the tabulation of FIG. 1, method *a*. Each digit location can be interrogated by one of the three signals, 1, 0, or $\phi$. There is an output signal when all interrogating digits match a stored word. The $\phi$ ("don't care") signal is used for digits which are not interrogated. It takes 23 cycles to obtain the three words of FIG. 1, method *a*.

If, in addition to a yes or no answer, the memory can yield the information that more than one word exists in the memory for a set of interrogating bits, the number of retrieval steps can be reduced significantly from that of the method described by Frei and Goldberg. An example of this plurality sense method is shown in FIG. 1, method *b*; it requires only 16 cycles compared with 23 for the method described by Frei and Goldberg. This plurality sense is similar to an order readout suggested by Seeber and Lindquist for a parallel readout memory.

A unique method of reading out of a memory in a series-parallel fashion was devised by Lewin. One can read out in an ordered list. The requirement for this readout is that the memory provide two sense outputs for each digit of the word; one is used to detect any 1's present in any of the interrogated words and the other is used to detect any 0's present in the interrogated words. Thus, each digit-sensing operation will reveal: (1) only 1's, (2) only 0's (3) a combination of 1's and 0's (labeled X), or (4) neither 1's or 0's (labeled Y). A Y result indicates that the word does not exist in the memory. An example is shown in FIG. 1, method *c*. Lewin's method requires only $2w-1$ cycles for complete readout of a number, $w$, of words with the same initial interrogation segment. His method may be modified to one sense output per digit if the sense can determine a match condition either between 1's or 0's. This modified Lewin method, shown in FIG. 1, method *d*, requires $2(2w-1)$ cycles.

The parallel readout scheme requires all data digits of a word to be read in parallel by appropriate word logic. In addition, when the memory is interrogated, the words are read in sequence until all words with the same interrogating segment are read from the memory. This sequencing does not necessarily means that the words are in an ordered list. They are usually read according to geometrical position in the memory.

B. The associative memory cell

The associative concept is a matching and scanning process of the stored data not unlike the one employed by the human mind or, in the simplest form, a catalog file. In general, the associative process is connected with large-capacity storage. It is widely felt that high-speed associative memories commence being generally attractive at about $10^5$ words of $10^2$–$10^3$ digits, or $10^7$–$10^8$ bits. Because of the large number of bits involved, it is necessary that the cells be designed so as to permit production of large arrays at a low per-bit cost.

In a conventional random-access memory, the cell need have only the capability to store the binary bit. However, an associative memory cell must perform comparison logic in addition to storage at the cell. The logic performed at the cell between the storage state and the interrogate signal is of two categories: (1) binary, and (2) ternary or double binary. The first type of logic is used to interrogable memories of FIG. 1 and requires that the total portion of the interrogated segment be used. This logic produces a signal when there is not a match between storage and interrogation bit and does not produce a signal when there is a match; this is the "exclusive-or" function. The complement of the exclusive-or may be used as an alternative. If any portion of the interrogated segment can be used for interrogation, as in the fully interrogable case, the data bits not being interrogated must give a signal equivalent to a match independent of the stored state. If this function is to be performed by one variable representing one interrogating line, this signal must have three states. The cell therefore must perform ternary logic. The interrogate signal has three states: 1, 0, and $\phi$ (don't care). Alternatively, two lines with binary information can form the interrogate, hence the name double binary. One of these lines performs the 1, 0 matching function; the other acts as a gating line, gating only the digits interrogated.

The requirements of the sensing arrangement are also an important consideration in the design of the cell. In the case of the serial readout, such as in the memory described by Slade, the memory must have a sense arrangement in the direction of the word which will be termed a "word-read" organization. This word-read organization must be such that it is possible to determine if there is a match between the interrogation segment and the interrogated of all the interrogated digits or, alternatively, it can represent the complement, which is one or more mismatches. For the series readout, all the word senses are connected to give a single sense readout for the memory.

In the case of parallel readout, each word-read sense is separate and connected to word logic. Considering a three-dimensional array in which two directions form the $n$th digit plane and the third forms the word direction, the parallel readout requires a plane (or a plane of threaded lines) as a readout plane. This is called a "digit-read" organization. Since only one word is read at each sequence in the parallel readout scheme, the digit-read may be destructive and the word rewritten into the memory. The conflict between word-read and digit-read organizations for the fully interrogable memory necessitates: (1) a simultaneous word and digit-read organization, (2) a switchable read organization, or (3) two memory arrays in parallel, one with digit-read organization and the other with word-read organization.

When using Lewin's scheme, the cell requires a word-read organization and a two digit-read organization. One read organization is sensitive to 1's and another to 0's. The modified Lewin scheme would require only one digit-read at the cost of twice the number of cycles. However, this digit-read organization must be capable of sensing 0's or 1's on command.

C. The cryotron

In 1956, Buck published a paper on a switching element made of superconducting material called a "cryotron." This device comprised the control lead wire wrapped around a tantalum cylinder called the gate. The cryotron was submersed in liquid He under atmospheric pressure (B.P. −4.22° K.) and both the lead (Tc=7.23° K.) and the tantalum (Tc=4.39° K.) were superconducting. The tantalum has a lower critical field than lead at the operating temperature. When a current sufficient to produce the critical field of tantalum flows in the control, the tantalum cylinder changes from its superconductive to its normal state. This transition is extremely sharp and thus the cryotron is an excellent switching device. Although other people preceded Buck in describing superconductive devices (25, 26, 27, 28), Buck in his article gives a unified and complete treatment of the application of superconductive computer devices. He shows the uses of the cryotron in various logic circuits such as flip-flops, AND and OR circuits. The four-terminal cryotron can be considered as an inverter. With two or more independent control elements, it is inherently a NOR circuit. Because of the relatively low resistivity of metal at low temperature, the $L/R$ time constant associated with the inductance of the control and the resistance of the gate was at best in the order of 10 μsec. Its relatively large time constant and therefore its relatively low operating frequency make the wire-wound cryotron relatively unattractive for computers.

The film cryotron was introduced later and because of its small dimensions increased the operating range in terms of speed. Because of the simplicity of the evaporated device, the thin-film cryotron can be "batch" fabricated and is sufficiently attractive to overcome the disadvantage of a low ambient temperature. FIG. 2 illustrates the cross-film cryotron. There is a substrate layer 50 which supports a ground plane layer 52 which, in turn, supports an insulating layer 54. The control strip 56 crosses over the gate strip 58 and both are over a shield or ground plane 52 for best results. The crossed-film cryotron, as the name indicates, has its gate and control at right angles. An insulating film strip 60 lies between the gate and control strips.

The curves of FIG. 3 show the resistance R of the gate as a function of gate current $I_g$ with a constant control current $I_c$. The control alters the transition point. For a given gate current, the control current can cause transition of the gate from the superconducting-to-normal state. $I_{gc}$ is the critical value of gate current. The curves of FIG. 3 represent the idealized characteristics.

An extension of a simple cryotron cell has served for the majority of proposed cryotron associative memory systems described in the literature. One form of this cell is shown in FIG. 4. The cell can store (1) a clockwise current, (2) a counterclockwise current, or (3) no current. Two of these three states can be used for binary storage. The choice will depend largely on the type of word and digit logic. If a 1 is considered as a clockwise current and a 0 as a counterclockwise current, the 1 is written into the memory by the combination of a negative current in the digit drive line and a current of either polarity in the word write, the latter current being sufficient to keep cryotron 1 in the normal state. For a stored 0, a positive pulse is used as the digit drive. If a negative current with the same amplitude as that for write is also used as an interrogate 1 on the digit drive, the match condition would be all current $I_0$ in path 1, and no current in path 2. For a mismatch, the current in path 2 is equal to $2I_s$, where $I_s$ is the stored current. For an interrogate 0 using a positive pulse, the same process occurs, and cryotron 2 is excited only by a mismatch. The don't-care function $\phi$ is represented by no current in the digit interrogate line. The truth table for the interrogate-storage process is shown in FIG. 5.

If $I_{ws}$ is the maximum current in the word sense and $I_s$ is the stored current, the combination of $I_s$ (control) and $I_{ws}$ (gate) must be insufficient to excite cryotron 2, but $2I_s$ must be sufficient to excite cryotron 2 with no current in the word sense. If cryotron 2 is represented by an ideal crossed-film cryotron with a characteristic parabolic phase curve, then the superconducting normal boundary can be represented by $$I_c^2 = I_{cc}^2 - \frac{I_g^2}{G^2} \quad (1)$$

where $$G = \frac{I_{gc}}{I_{cc}} \quad (2)$$

and $I_g$ is the gate current, $I_c$ is the control current, $I_{gc}$ is the gate current for 0 control current, and $I_{cc}$ is the control current for 0 gate current. Thus, from Equation 1 when $I_s$ is the control current during the don't-care operation.

$$I_s^2 < I_{cc}^2 - \frac{I_{ws}}{G^2}$$

For mismatch operation $$2I_s > I_{cc}$$

or $$I_s^2 + \frac{I_{ws}^2}{G^2} < I_{cc}^2 < 4I_s^2 \quad (3)$$

Thus $$I_{ws}/G < \sqrt{3}I_s \quad (4)$$

One also must be aware of the tolerances in each parameter, and the worst case must be considered.

Figure 6:
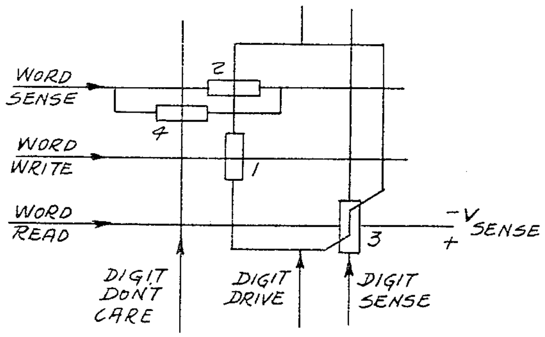
FIG. 6 is a schematic diagram of an associative memory cell having an additional cryotron and digit drive for don't-care operation.

The addition of a cryotron and another digit line can circumvent a possible tolerance problem indicated by Eq. 4. Such a circuit is shown in FIG. 6. A current is fed to the digit don't care whenever the bit is to be interrogated by a 1 or a 0, thereby exciting cryotran 4. For digits with don't-care interrogate functions, cryotron 4 is superconducting and acts as a shorted shunt bypassing cryotron 2.

The combination of the word-read current and the stored current can excite cryotron 3 which forms an AND gate for the above two variables. The excitation depends on the relative directions of the stored current and the sense current. A word-read current and a stored 1 excite cryotron 3 when negative sense current is used. A stored 0 will not excite cryotron 3 whenever a posisegment in the word. The detection can represent a match tive current is used. A negative voltage across cryotron 3 signifies a 1 read from that digit of the memory.

Figure 7:
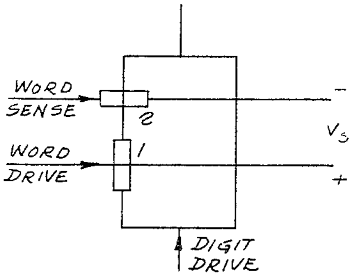
FIG. 7 is a schematic diagram of an associative memory cell useful when destructive read is allowed for the parallel readout case.

If a destructive read were used as allowed for the parallel readout case, the cell complexity and size could be reduced as shown in FIG. 7. The word drive is used for sensing the read in addition to write. A current in the word drive destroys the storage in the cell; a positive $V_s$ is a 1 and a negative $V_s$ is a 0.

The number of digit lines determines the horizontal width of the cell in the evaporated circuit. The speed of some operations is an inverse function of this width. The degree to which the reading speed is related to the width is dependent upon the type of read system chosen and the word logic.

D. Word logic for parallel read system

The word logic can be divided into three areas: (1) word sense, (2) word read and write, and (3) word sequencing. Word sequencing involves sequential readout of the multiple responses. Davies and Newhouse and Fruin have described associative memories using cells similar to that of FIG. 6 with parallel readout. The following discussion, in general, applies to any of the three cells in FIGS. 4, 6 and 7, and specifically shows word logic design for the cell in FIG. 7. The word logic dominates the speed of a parallel-readout associative memory. Logical designs therefore are discussed with reference to operating speeds.

(1) *Word sense logic.*—The basic problem is to detect logically the superconducting lines, which represent a match condition, from the nonsuperconducting lines, which represent a mismatch. Since there may be a multiplicity of these superconducting lines, it is necessary to select one from all the others by a geometrical preference. A series network first detects all superconducting lines simultaneously. This series network in turn controls a ladder network which chooses a word by geomethrical position, usually the first from top or bottom of the memory.

Figure 8:
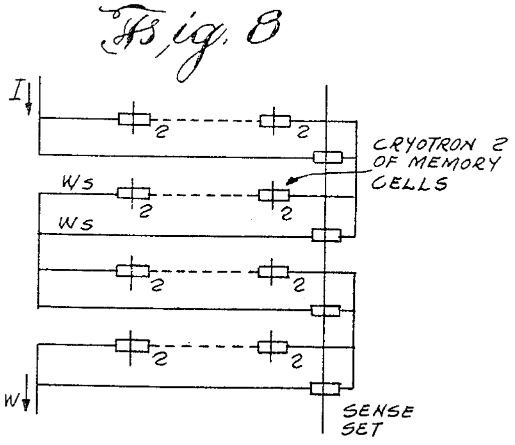
FIG. 8 is a schematic diagram of a series sensing network.

The series circuit as shown in FIG. 8 simultaneously detects all superconducting lines. $W_s$ is the word sense line which is totally superconducting only for a match. $\overline{W}_s$ is a parallel line which represents the complementary function of $W_s$. Each word sense set comprising $W_s$ and $\overline{W}_s$ is in series with the corresponding set of all other words. The sense set line initially sets all the current into the $W_s$ lines. If any mismatch occurs, the current is shifted from $W_s$ to $\overline{W}_s$ in the mismatched words. This operation has a time constant of $2L/R$ for the worst case, where L is the inductance of $W_s$ or $\overline{W}_s$, and R is the resistance of the cyclotron controlling the mismatch. The lines $W_s$ and $\overline{W}_s$ control the logical operation of read, write, and sequencing.

Figure 9:
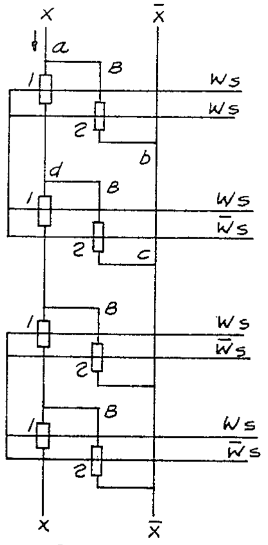
FIG. 9 is a schematic diagram of a ladder network.

Once the information is obtained for words whose integrated segments match the interrogating word, the read or write signal must decide which of all the matched words to excite first. This decision necessitates a geometrical choice, usually the first match word from either the top or the bottom of the memory. A ladder network controlled by the word sense as shown in FIG. 9 can find the first match word from the top of the memory. A current I, is fed to X. The first match word (current in $W_s$) causes the current to be blocked by cryotron 1, which is excited by $W_s$. When cryotron 1 is excited, I switches to $\overline{X}$ at the corresponding word location. All preceding mismatch words had their respective cryotron 2 excited and thus I remains in X. The current I, in branch B, will control the read and write logic. In large-capacity memories, the ladder or logic of finding the first superconducting sense line dominates the overall speed. A worst case condition of all mismatches except the last word can be considered. This case has a time constant $nL_{ab}/R_2$, where $n$ is the number of word locations in the memory, $L_{ab}$ is the inductance of line segment *a–b*, and $R_2$ is the resistence of cryotron 2. The linear dependence of time constant with respect to $n$ is only justified when one assumes that the inductance of segment *ad* decreases as the number of stages in the ladder is increased. Because of sequencing from the top, it is known that there are no other matches when the last word is read. Thus, $nL_{ab}/R_1$ can be considered the worst-case time constant. It is a function of the number of word locations, $n$. The current, I is always either in X or $\overline{X}$. If I has remained in X beyond the last word, then a 1 (or none, if on the first-sequence step) of the matched words in the memory were read.

Figure 10:
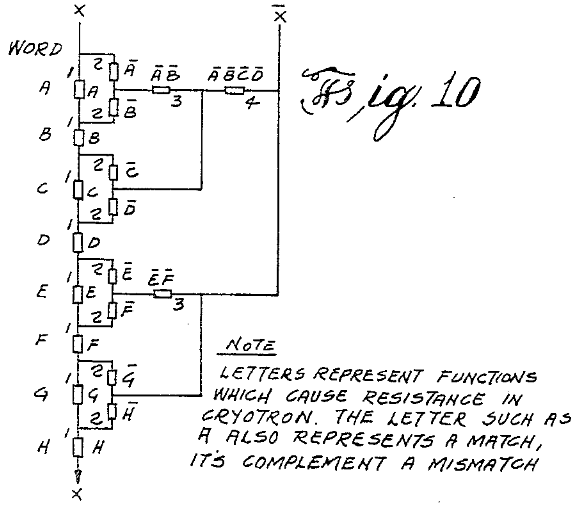
FIG. 10 is a schematic diagram of a ladder-tree network.
Figure 11:
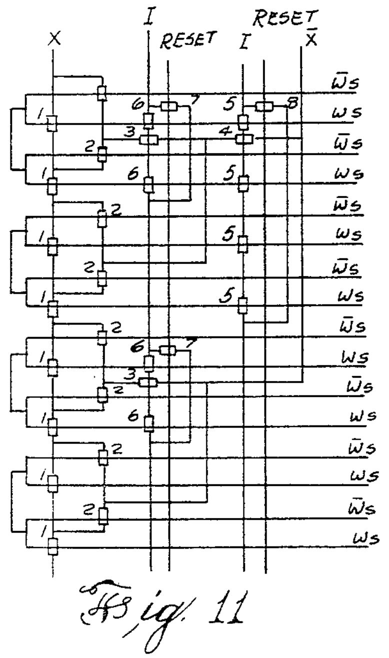
FIG. 11 is a schematic diagram of a ladder-tree network with a control network.

At the expense of increased complexity, the above time constant may be reduced in a ladder-tree. This circuit is shown in FIG. 10. Each letter such as A represents a word with current in $\overline{W}_s$. Thus AB forms an AND function when both words A and B are mismatched to the interrogating segment. The cryotron 3 excited by AB becomes resistive when both A and B are mismatched. All the other cryotrons operate similarly. The circuit of FIG. 11 shows the controls corresponding to the gates shown in FIG. 10. Cryotrons 1 are in the same position as in the ladder of FIG. 8 and perform the same function. Cryotrons 2 are supplemented by the addition of cryotrons 3 and 4 for an 8-word tree. The number of levels, as defined by cryotrons 2, 3, 4 in the 8-word tree, is the smallest integer greater than $\log_2 n$. This ladder-tree changes the worst-case approximate time constant from $nL_{ab}/R$ to $(\log_2 n)\ L_{ab}/R$. The cryotrons 3 and 4 (and higher numbers in larger memories) operate as AND gates.

Figure 12:
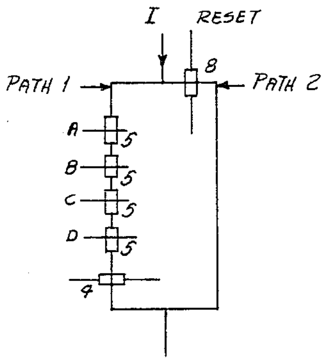
FIG. 12 is a schematic diagram of a cryotron control circuit for the ladder-tree network of FIG. 11.

Since, for example, $$\overline{ABCD}=(\overline{A+B+C+D}) \qquad (5)$$

one can use a control circuit for the ladder tree as shown in FIG. 12. This function corresponds to the control circuit controlling cryotron 4 in FIG. 11. Cryotron 8 sets the current, I, initially into path 1. Cryotron 4 is excited only if A, B, C, D, or any combination is present. This type of control circuit is incorporated at each level of the tree with the exception of the first, as shown in FIG. 11. The time constant of the control used at the last level is the largest control time constant, and in large-capacity memories exceeds the time constant of the gates of the ladder tree. The worst-case time constant is for a match in the first word in the memory and for a mismatch in all other words. The time constant $2L/R$ is that of a single cryotron-gate resistance, and L which must be the length of half the memory. Thus, this time constant is a function of the number of word locations. However, for multiple readout, this ladder-tree can be made faster than the ladder.

(2) *Word read and write logic.*—The word read and write are controlled by a current present in the branch of cryotron 2 in either the ladder (FIG. 9) or the ladder-tree (FIG. 11). A series network is used to maximize operating speed. The series network defines a network in which the word function line contains a dummy in parallel, and this set is in series with all other sets. A current is switched from the function line used for the function of read, write, or sense to a dummy path if the word is not to be read or written. The parallel network defines a network of function lines which are all connected in parallel, and the chosen line is the only superconducting line. The series network has a $2L/R$ time constant which is independent of the number of series sets. However, the parallel network has a $nL/R$ time constant, where $n$ is the number of word locations. In large-capacity memories, the latter time constant, which is dependent upon the number of words in memory, can become excessive. Newhouse and Fruin use a parallel network for writing which will considerably limit their writing speed in large arrays.

Figure 13:
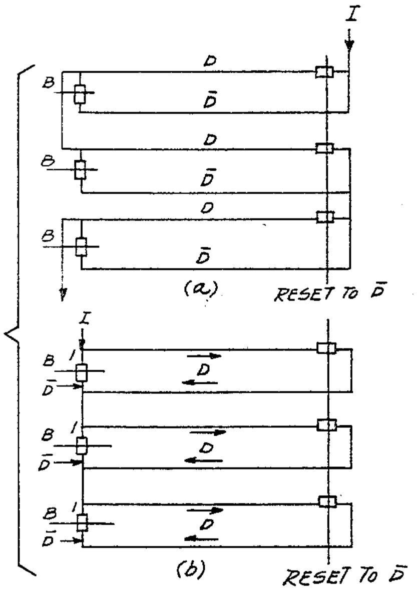

Two series geometries are shown in FIGS. 13*a* and *b*. The geometry of FIG. 13*a* would not satisfy the series connection for word sense, but does satisfy the word read or write, since the controlling cryotrons are located at one end. Either geometry in FIG. 13 can be used at the designer's discretion for writing or reading. D can be the word drive line as labeled in the cell of FIG. 7, and can be either the word read or word write of FIGS. 4 and 6. The series network is in itially set with the current in the D line, which is the dummy line. B represents the branch which contains cryotron 2 of the ladder or ladder-tree network. Thus a current in B causes a current to switch from $\overline{D}$ to D line. Thus the word which has its current in D is activated for the write or read process. The time constant of either series geometry *a* or *b* is $2mL_c/R$, where $L_c$ is the inductance of a line across each memory cell, R is the resistance of the cryotron, and *m* is the number of cells or binary digits in a word.

Figure 14:
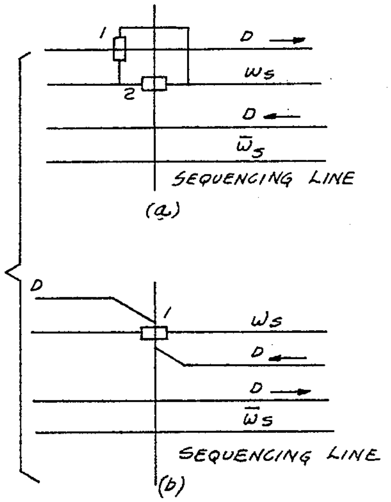

(3) *Word sequencing.*—For multiple match responses, a sequential readout is necessary. As shown by Davies the sequential operation can take the advantage of the drive current in the cell of FIG. 7 and the read current of the cell of FIGS. 4 and 6. The circuit is shown in FIG. 14. A parallel set of cryotrons 1 and 2 (Davies circuit) as shown in FIG. 14*a* or a single cryotron acting as an AND gate as shown in FIG. 14*b*, is inserted in series with the word sense, $W_s$. When the drive current is in line D, which can occur only in the one word being read or written, a current in the sequence line can cause the current in $W_s$ to shift to $\overline{W}_s$. Only the word which is activated will have both cryotrons 1 and 2 of *a* or cryotrons 1 of *b* excited. The word which was read now has current in its $\overline{W}_s$ and therefore acts as a mismatch word for the next read or write in the sequencing procedure. Thus one can sequentially read each word until the X line after the last word contains the current, which signifies there are no other words in the memory with the same interrogating segment.

The sequencing can also be accomplished by using a simple memory bit for the sequencing operation in each word. This added cell or digit can store the information that the word has been read or written and thus cause the sense line to assume a mismatch for the next step in the sequence. An example of this type of circuit is shown in FIG. 15. The sequencing bit is interrogated with 0's along with the interrogation. A 1 is placed in this bit when a word is read from or written into the memory. Since there is no current in the D line for writing 0's into all sequencing bits, the 0 is written by a large negative current pulse that overdrives the cell, causing storage in the counterclockwise direction.

The simple circuit of FIG. 14 will operate with a nondestructive read, but will not operate with a destructive read. In the case of a destructive read, all sense information must be destroyed before or during the rewrite process, and the memory must be reinterrogated in the next sequence. The circuit of FIG. 14 assumes that the sensing remains during the complete interrogation for multiple responses.

D. Parallel readout associative memory

The circuit for one word of an associative memory with two of the many digits is shown in FIG. 16. This word circuit incorporates the circuits of FIGS. 7, 8, 13*b* and 15. Y is the drive line for the sequencing bit and X is the drive line for the ladder.

The operational steps are as follows: The currents $I_{ws}$ and $I_w$ are always in the memory as constant currents. $I_w$ is always in D position at the beginning of the cycle.

(1) READ AND RETAIN (*a*) Apply large negative current pulse $I_y$ to store counterclockwise current in all Y cells.

(*b*) Apply current pulse to $S_s$ to set $I_{ws}$ to $\overline{W}_s$.

(*c*) Interrogate $I_D$'s with 1, 0, or $\phi$ as represented by magnitude $+I_o$, $-I_o$, and 0 current steps, respectively, and apply a current step $I_y$ to Y. Current $I_{ws}$ switches to $\overline{W}_s$ in all mismatched words.

(*d*) Apply current step $I_x$ to X at top of memory. This current is routed through cryotron 2 of the first match word $I_w$ is switched from $\overline{D}$ to D in this first match word, and a voltage pulse appears across the $I_D$ lines in the cells which are interrogated by $\phi$. A 1 is a negative voltage; a 0 is a positive voltage referred to the top.

(*e*) Remove current $I_x$; $I_w$ remains in D.

(*f*) Replace $\phi$'s with the digits of the word just read. $I_o$ for a 1 and $-I_o$ for a 0.

(*g*) Apply positive current, $I_y$, to Y to write 1 into sequencing cells.

(*h*) Apply current to $D_s$ to reset $I_w$ to $\overline{D}$.

(*i*) Remove all $I_D$'s. Word is now rewritten into memory. Remove $I_y$ leaving a clockwise stored current in Y cell of word.

(*j*) Repeat steps *b* through *i* until all words are read from memory.

(*k*) Remove all $I_D$'s from interrogation bits.

(2) READ AND DESTROY (*a*) Apply current pulse to $S_s$ to set $I_{ws}$ to $\overline{W}_s$.

(*b*) Interrogate $I_D$'s with 1, 0, or $\phi$ as represented by $+I_o$, $-I_o$, and 0 current steps, respectively.

(*c*) Apply current $I_x$ to X at top of memory. This current is routed through cryotron 2 of the first match word. $I_w$ is switched from $\overline{D}$ to D in this first match word, and a voltage appears across the $I_D$ lines that are interrogated by $\phi$. A 1 is a negative voltage; a 0 is a positive voltage.

(*d*) Remove current $I_x$; $I_w$ remains in D.

(*e*) Replace all $I_D$'s with 0's ($I_D=-I_o$).

(*f*) Apply current to $D_s$ to switch $I_w$ from D to $\overline{D}$.

(*g*) Repeat steps (*a*) through (*f*) until all words are read from memory.

(*h*) Remove all $I_D$'s from all digits.

(3) WRITE (*a*) Apply current pulse to $S_s$ to set $I_{ws}$ to $\overline{W}$.

(*b*) Interrogate $I_D$'s with 0's as represented by $-I_o$ current step.

(*c*) Apply current step $I_x$ to X at top of memory.

(*d*) Remove current $I_x$; $I_w$ remains in D.

(*e*) Replace $I_D$'s with word.

(*f*) Apply current $D_s$ to switch $I_w$ from D to $\overline{D}$.

(*g*) Remove $I_D$'s from all digits.

The timing for each step in the read process is approximately as shown on the next page.

E. Associative memory with Modified Lewin readout

Although the Modified Lewin readout requires $$2(2w-1)$$

sequences to read out *w* words, whereas the parallel readout only requires *w* sequences, each sequence of a Modified Lewin readout can require less time, and the system can basically read out faster than the parallel readout. A super-conductive example of a circuit using the Modified Lewin readout is shown in FIG. 17. This circuit incorporates a memory bit similar to that of FIG. 6. A 1 is represented by a clockwise stored current, and a 0 is represented by a counterclockwise stored current. Cryotron 3 has in-line cryotron action with the control line from the cell and has cross-film cryotron action with the word-write control line, W. The word-write current amplitude causes a readout which is a voltage across the gate of cryotron 3 when the stored current and the digit read current, $I_{RD}$, are in the same direction. Thus, by using both polarities of digit read current, 1's can be read nondestructively without reading the 0's, and vice-versa, in sequence as required by a Modified Lewin scheme. The word-logic circuit represented by cryotrons 4, 5, and 6 is used for writing and is a combination of the circuits of FIGS. 9 and 13*b*. The R and $\overline{R}$ line which contains cryotron 7 is a series read circuit (see FIG. 13*b*) controlled by a series sense circuit (see FIG. 8). This sense circuit also controls the latter.

The steps for memory operation are as follows: $I_w$ and $I_{ws}$ are constantly in memory as constant supply currents. Current $I_w$ is always in W at the onset of any cycle.

(1) READ AND RETAIN (*a*) Apply current to $S_s$ to set $I_{ws}$ to $W_s$.

(*b*) Interrogate $I_D$'s with 1, 0 or $\phi$ as represented by a $I_o$, $-I_o$, and 0, respectively. $I_{ws}$ switches from $W_s$ to $\overline{W}_s$ in all mismatched words.

(*c*) Apply current $I_R$. $I_R$ will flow in R for all matched words and in $\overline{R}$ for all mismatched words.

(*d*) Where $I_D$'s are $\phi$, apply negative $I_{RD}$ to read 0's and remove.

(*e*) Apply negative $I_{RD}$ to same digits as in step (*d*) to read 1's and remove.

(*f*) The first two cycles have been completed, and $4w-4$ cycles remain. Proceed according to the algorithm of the Modified Lewin process as indicated in FIG. 1(*d*) until all accesses are complete. If a 0 must be changed to 1 in the interrogate, a reset of $I_{ws}$ from $\overline{W}_s$ to $W_s$ is necessary preceding the 0 to 1 change. If a $\phi$ must be changed to a 0, no reset is necessary.

(*g*) Remove $I_R$ and all $I_D$'s.

(2) WRITE (*a*) Apply current to line $S_s$ to set $I_{ws}$ to $W_s$.

(*b*) Interrogate $I_D$'s with 0's. $I_{ws}$ switches to $\overline{W}_s$ in all mismatched (non-empty) words.

(*c*) Apply current $I_x$ to X. Current will be routed through cryotron 5 of first empty-word location. $I_w$ switches from $\overline{W}$ to W in this word.

(*d*) Change $I_D$'s to represent word.

(*e*) Remove $I_x$.

(*f*) Reset $I_w$ from W to $\overline{W}$ by a current in $S_w$.

(*g*) Remove $I_D$'s.

(3) WRITE AND DESTROY (*a*) Read words as in read and retain, steps *a* to *g*.

(*b*) Apply current to $S_s$ to switch $\overline{W}_s$ to $W_s$.

(*c*) Interrogate $I_D$'s with word.

(*d*) Apply current $I_x$ to X.

(*e*) Change $I_D$'s to 0's.

(*f*) Remove $I_x$.

(*g*) Reset $I_w$ from W to $\overline{W}$ by a current in $S_w$.

(*h*) Remove $I_D$'s.

The time constants for step 1(*f*) depend on the number of cycles which is $2(2w-1)$. However, only $2w-1$ represent changes in the interrogation as shown in the example in FIG. 1*d*. After step 1(*e*), there are only $2w-2$ changes. At least one-half of those changes might be from 0 to 1, thus requiring in addition a reset of the sense. If, for order of magnitude results, the total time constant is considered to be the sum of the three or four time constants, the total time constant is $(7/2)\ (2w-2)\ 2mL_c/R$. The important point is that the timing is independent of $n$, the number of word locations in the memory. The parallel readout case appears as about $2wnL_c/R$. For large-capacity memories ($n \gg m$) there is no doubt that the modified Lewin approach does utilize a ladder and must have a worst-case write time proportional to the number of word locations. Thus the associative memory with the Modified Lewin scheme can be considered as a memory with the fast readout and moderately fast write.

The read and destroy command combines the read and the write command, and its speed is dependent upon the number of word locations in the memory. An addition of two cryotrons in the word logic can increase the speed for read and destroy. FIGURE 18 shows the added circuitry for rapid destroy. The circuit contains the addition of $W_{s1}$ line, cryotrons 10, 11, and 12, and the two control lines Y and $\overline{Y}$. Current $I_y$ is always in Y or $\overline{Y}$. This rapid destroy circuit can also be added to the parallel readout of FIG. 16. If a current is in Y the memory is just that of FIG. 17. However, for rapid destroy $I_y$ is in $\overline{Y}$, allowing the word sense to control $I_w$ and destroy the word. The read process is the same as read and retain. The procedure for destroy follows.

(4) RAPID DESTROY (Current $I_y$ is in Y unless otherwise stated)

(*a*) Apply current to $S_s$ to switch $I_{ws}$ to $W_s$.

(*b*) Interrogate with word or word segment if all words with the same segment are to be destroyed.

(*c*) Change $I_y$ from Y to $\overline{Y}$. $I_w$ switches from $\overline{W}$ to W in all matched words and destroys those words.

(*d*) Change $I_y$ from $\overline{Y}$ to Y.

(*e*) Change all $I_D$'s to 0's.

(*f*) Apply current to $S_w$ to reset $I_w$ from W to $\overline{W}$. All 0's are now written into word location(s).

(*g*) Remove all $I_D$'s.

The destroy process time does not use the ladder and thus is independent of the number of word locations in the memory. It requires the same order of magnitude of time as for the read process. Furthermore, all the words in the memory can be destroyed in one rapid cycle by using all $\phi$'s as the interrogating bits. The memory can also alter any or all the digits of *one* word in one rapid cycle by writing the altered word in the memory step *d*. A common segment of many words cannot be changed in one cycle without additional circuitry because all the unknown digits interrogated by $\phi$ will be destroyed.

The use of a Lewin readout scheme instead of a Modified Lewin scheme requires two senses for each digit. This in turn requires three lines from each memory cell in the digit direction instead of two. The width of the cell must be widened by 3/2 and thus the inductance per cell, $L_c$ would be 3/2 greater, decreasing the speed of each switching process which is in the horizontal plane by 2/3. Comparing the two schemes in FIG. 1, the process of changing the read from 0 to 1 requires negligible time as compared with the interrogate. Both schemes require the same interrogate changes. Thus the Modified Lewin scheme is faster, but requires more digit logic which may operate at room temperature.

F. Comparison of systems

The comparison between parallel readout and Modified Lewin readout shows that:

(1) The Modified Lewin readout is a much faster readout. However, the write speeds are about the same.

(2) The Modified Lewin readout permits an ordered retrieval of information. The parallel readout does not unless the ordered retrieval coincides with the geometrical order.

(3) The Modified Lewin requires more digit logic to interrogate, read, and logically interpret. This digit logic can be external to the cryostat.

The associative memory with Modified Lewin readout has the edge in operation at the cost of some additional hardware.

Comparing the associate memory with Modified Lewin readout with a random-access memory, the random-access memory will have a faster write process. However, if one assumes a constant word length, there must be a crossover point as the memory size increases at which the read process of the associative memory is faster than that of the random access. The speed of the associate memory is independent of number of words, whereas the speed of the random-access memory is proportional to $n^{1/2} \log_2 n$. The associative memory has inherent redundancy in the system; the random-access memory does not. One can build an associative memory, for example, 20 percent larger than specified for a given application. If 20 percent of the word locations do not operate, but these word locations are scattered geometrically throughout the memory, the memory operates within specification, since there is no addressing according to geometry. This latter point is a strong feature in batch-fabrication. The associative memory is more complex and can be estimated as costing more per bit unless the inherent redundancy feature makes a sufficient difference in memory plane yield between the two systems.

II. A NEW APPROACH TO HIGH-SPEED WRITING AND TO THE INTERCONNECTION PROBLEM

A. A new approach

To read the words representing the multiple responses in $w$ sequences requires extensive word logic linking all the circuits common to the words. The Lewin readout eliminates the necessity for most of this word logic for the reading operation. However, during the write process one must interrogate the memory to find the empty word location. One finds multiple responses which represent all the empty word locations. Unfortunately, to write into the memory one cannot use a process which resembles an inverse Lewin readout. If the necessary word logic is used to obtain a choice of one of the multiple responses for the write process, then this logic can also be used for parallel readout with only slight modification. However, in the case of cryogenic associative memories, a faster readout is obtained using the Lewin process than parallel read. The combination of a fast read and moderately fast write is feasible.

A new approach to the realization of multiple responses uses a sequential interrogation of a set of address bits for the determination of an empty location for the write processes, henceforth called sequentially addressed write (SAW). This approach assumes that the associative memory is designed for a Lewin readout. As shown in FIG. 19, the associative memory is increased by $q$ bits per word into which an address is permanently written for each word; Thus $q=\log_2 m$, where $m$ is the number of word locations. The $q$ bits can have the same characteristics as the data bits except for the ability to write the permanent information into these bits. This $q$ set forms an equivalent of the word logic previously discussed. When one desires an empty location, one interrogates the data ($d$) bits with 00 . . . 0. A typical Lewin multiple response readout is obtained along the $q$ bits. The $q$ bits are interrogated in the Lewin readout fashion until a single word is obtained. This word, or more conveniently the next Lewin interrogation word, is stored in a register of $q$ bits for the next write operation. This register is called the Next Word Register (NWR). To write into the word location, the memory is interrogated with the word just found on the $q$ bits. Thus only one response is obtained and used to control the write driving source. When the next write command is issued, the interrogation begins with the word stored in the aforementioned NWR which is either the last word used for writing or the next Lewin word. In other words, the Lewin process is not started from the beginning but the point of termination of the last word.

However, between the writing of one word and the next word, words may be destroyed, thereby creating empty locations. These newly created empty locations fall into two categories:

(1) Their address is a number less than that stored in the NWR.

(2) Their address is a number more than that stored in the NWR.

The process treats the empty locations belonging to the latter category as if they existed from the beginning of the cycle. The process ignores empty locations of the first category until the next pass through the memory. Thus in one pass through the memory, $w_o$ word locations are read in $2w_o-1$ cycles where $w_o$ is the sum represented by the number of empty locations present at the beginning of the pass and the number of empty locations generated which satisfy category 2. After the first pass is completed the process is repeated. Thus on the $n^{th}$ pass the $w_n$ empty word location is the sum of those words of category 2 for the $n-1^{th}$ pass and those words of category 1 for the $n^{th}$ pass. On this $n^{th}$ pass, $w_n$ word locations are written into in $2w_n-1$ cycles.

Two additional comments can be mentioned: If the memory is full, the SAW process will indicate that there are no empty locations in a pass consisting of one cycle. The process requires approximately two cycles per word to determine an empty location. Since the number of cycles per word is an average, this number for any particular write command is variable. The use of the word in the NWR, instead of always starting the process from the beginning, is the mode of operation which ensures an average of slightly less than two cycles per empty word location. The SAW process is outlined in the flow diagram of FIG. 20.

In summary, the extra $q$ bits per word coupled with the Lewin readout process using the NWR perform all the functions required of the AFA and the necessary sequencing networks. The latter network logically performs a transfer to the next word after one word is found until all words of a multiple response set are read. The word logic controlling the write can be held to a minimum since it only responds to a single response instead of multiple responses. This network in most cases would be one flip-flop per word.

Two basic advantages of this memory are related to cost and versatility:

In most cases of batch fabrication of the memory such as by evaporation deposition or printing, the cost of making the additional $q$ bits similar to the data bits is small compared with the making of a complex logic network even if the complex logic requires fewer components. The $q$ bits can be identical with the $d$ bits of FIG. 19. The $q$ bits must have the same features as the $d$ bits except that their storage can be permanent. Thus, if convenient, one may choose to make the $q$ bits from devices which are different from the $d$ bits.

The memory can be used in random-access fashion when the program requires the labeling of each stored word without decreasing the number of data bits, $d$, by using the $q$ bits as a decode matrix. The $q$ bits store the address permanently and thus a word can be interrogated by address.

B. Saw circuit models

A cryotron model of one word of a CAM using the SAW process is shown in FIG. 21. Additional $q$ bits are added to the data ($d$) bits. These $q$ bits contain a number which is permanently stored and which numbers each word. These $q$ bits are fully interrogable. Note that the circuit shown is for only one $q$ bit and one $d$ bit in the word. For the circuit model of FIG. 21, the permanent address can be assigned by either evaporating a gate in position 1A or 1B in the $q$ bits. For example, if a clockwise current represents a 1, and counterclockwise current a 0, then the 1B can represent a 1 and 1A a 0. If a positive current, $I_D$, is present as the memory is cooled through the gate transition temperature, and if this current is removed only after the operating temperature has been attained, there will result the necessary stored current representing 1 or 0. Thus, the address is inherent to the design, and storage of currents in the $q$ bits can be accomplished in the initial cooling process.

The $d$ bits are read by the Lewin readout process with don't care $\phi$ interrogating the $q$ bits. When using the SAW process for writing, the current $I_W$ is set in line $W_s$. The $d$ bits are interrogated 00 . . . 0 and the $q$ bits with $\phi\phi$ . . . $\phi$. All empty word locations result in a match and for these word locations $I_W$ remains in $W_s$. Since cryotron 4 is excited for a match only, a read current $I_{RQ}$ only reads the $q$ bits of the matched words. As previously discussed for the SAW process, a Lewin reading process is performed on the $q$ bits until a $q$-word is found representing an empty location. When this word is found, there results from the procedure one, and only one word location which current is in $W_s$; all others have current in $\overline{W}_s$. Cryotron 6 is excited for that word location and a current, $I_W$, permits writing into that empty location.

In the SAW process, when the next write command is issued, the interrogation of the *q* bits begins with the next word in the Lewin reading process. This *q* word or the last *q* word used is stored in the next word register (NWR). Since the NWR and related logic for the *q* bits does not have to be a superconductive network, the circuit can be outside the cryogenic area.

FIG. 22 shows an alternate form for the *q* bits. The address is written into the memory by including 1A or 1B and 2A or 2B. For example, one can use 1A and 2A representing a 1, and 1B and 2B representing a 0. (There are three other possible combinations.) If cryotron 4 is excited for a particular word, current $I_{RQ}$ switches into line $R_q$, thereby exciting cryotron 1A or 1B, whichever is present. Currents to $I_A$ and $I_B$ then produce a potential where there are only 1's or 0's, respectively, in any of the words being read in the particular bit of the word. Thus, one can easily perform a Lewin readout. To interrogate with a 1, current $I_B$ is made sufficient to excite 2B for a mismatch or 0 in the *q* bit. Similarly, to interrogate with a 0, current $I_A$ is made sufficient to excite 2A for a mismatch. For interrogation, $I_A$ and $I_B$ are 0. The alternate form of the *q* bit uses a purely mechanical means for storage, whereas the form in FIG. 21 uses electrical means for storage.

An additional bit per word (called the empty bit *e*) can increase the speed of the SAW operation. The circuit model is shown in FIG. 23. The *e* bit is the same as the *d* bit except for the elimination of the digit read line and stores the information pertaining to the full-on-empty condition of the word location. For example, a 1 is stored if the location contains data and a 0 if it is empty. The addition of the bit essentially allows the $W_s$ line of FIG. 21 to be segmented into $W_q$ and $W_d$. The $W_d$ segment is only switched during the reading process and the $W_q$ during the SAW process. Instead of interrogating the memory with 0 . . . 0, one need only interrogate the *e* bit with 0.

C. The interconnection problem

For many logical designs, one requires a continuity in the superconductive circuit from word to word. Thus, it is required that either the memory be made on one continuous sheet, possibly in a roll, or that one have a low-inductance, zero-resistance connection between memory planes, whether these planes be laminated on one substrate or individual. However, the former does not appear to be feasible with present techniques; the latter appears to be difficult at present.

Use of the SAW process overcomes the interconnection problem. The *q* bits of SAW can be divided into bits which address the word and bits which address the plane. Thus, the interconnection problem between planes becomes a simple problem of wiring. No ultra-low inductance connections are necessary.

An alternate is to use a separate ladder for each plane and have the ladder control a permanent address for each plane. This address consists of a set of cryotrons excited whenever there is an empty location on the plane. A Lewin readout similar to the SAW is performed on this address. This scheme will be called Sequentially Interrogated Ladder (SIL). FIGURE 24 shows a circuit model for the SIL process which can be incorporated into the circuits described in Section I. A current in branch B controls the write line. If there is an empty register upon interrogation, current switches from X to $\overline{X}$ through branch B representing the 1st (from the top) empty word. Otherwise, the current remains in X. Cryotrons 3 and 4 act as AND gates. When $I_0$ is applied, current is switched to Y or $\overline{Y}$; the former if there are one or more empty locations on the substrate (current in $\overline{X}$), the latter if there are no empty location currents in X. If there are one or more empty locations, cryotrons 5(*l*) through 5(N) are excited. These are connected in series with those from other substrates to form an address. Thus, one obtains a readout which fits the Lewin process of reading. The lines which excite cryotron 6(*l*) through 6(N) are the interrogate lines. Cryotrons 6 are connected in such a manner that if one or more of the digits of the Lewin address do not match the assigned address, one or more of the cryotrons numbered 6 will be excited. Thus, current will either remain or be switched $\overline{Y}$. The need of the shunt lines $X_s$ arises from the necessity of preventing words being written into the planes other than the chosen plane. When $q_p$ is addressed for a given plane, all planes except that plane have current in $\overline{Y}$. The current in $\overline{X}$ in planes other than chosen must be switched to another superconducting line. Cryotron 7 remains excited at all times except during this writing process. Since cryotron 7 is excited by a current in $\overline{Y}$, if a current is in $\overline{X}$, it is switched to $X_s$ in all but the chosen plane. Thus, one prevents writing into any words on planes which are not the chosen plane.

Considering the circuit of FIG. 24 one can use a ladder network for determining the first empty registers on each substrate and use a Lewin interrogation approach to determine planes in an order with any empty word locations. When using the Lewin interrogation, one stores the last Lewin word for the $q_p$ bits and uses that word again at the next write command until there are no more empty word locations on the planes. The next $q_p$ word used is the next Lewin word. One does not begin again until after the last empty word in the last plane is filled. The complete process beginning from the first plane in the order is then repeated until all word locations are storing data.

Thus, if *p* is the number of planes, the number of lines to address the planes in the SIL process is $\log_2 p$.

What is claimed is:

1. In a content-addressed memory using a Lewin readout organization, an address section associated with each word organization comprising:

circuit means for adding a plurality of address bits to each word organization therein, the number of address bits being denoted by the letter *q*; and means for permanently writing into the *q* address bits of each word organization information constituting the address code of the word associated with that word organization;

2. An address section as set forth in claim 1, further including a register of *q* bits associated with the address bits of all word organizations for storing the address of the next empty word location, so that when it is desired to write into an empty word location it is only necessary to interrogate the memory with the *q* bits stored in the register.

3. An address section as set forth in claim 1, said content-addressed memory being of the cryogenic type.

4. An address section as set forth in claim 3, further including a register of *q* bits associated with the address bits of all word organizations for storing the address of the next empty word location, so that when it is desired to write into an empty word location it is only necessary to interrogate the memory with the *q* bits stored in the register.

5. In a content-addressed cryogenic memory using a Lewin readout organization, an address section associated with each word organization comprising:

three digit lines, an $I_{RD}$ line, an $I_D$ and an $I_{RQ}$ line, and three word lines, a $W_s$ line, a $\overline{W}_s$ line, and an $R_q$ line, said $I_{RQ}$ line branching into two sections one of which is the aforesaid $R_q$ line, and the other of which is designated the $\overline{R}_q$ line, said $R_q$ line being in the form of a loop which may be considered to consist of an advance line and a spaced return line joined at the ends which are not connected to said $I_{RQ}$ line, said $W_s$ and $\overline{W}_s$ lines being spaced branches of the $I_{WS}$ line of the word organization, said $I_D$ line having spaced branches;

three cryotrons, the first being at thre crossing of the $\overline{R}_q$ and $W_s$ lines with the gate being in series with the $\overline{R}_q$ line, the second at the crossing of one branch of the $I_D$ and $W_s$ lines with the gate being in series with the $W_s$ line, and the third at the crossing of the advance $R_q$ line and the $I_{RD}$ line with the gate being in series with the $I_{RD}$ line; and a gate deposited in series with one of the branches of the $I_D$ line, said $I_{RD}$ and $I_D$ lines, said second and third cryotrons and said last gate forming a unit for affixing an address bit to a word organization, there being a number of such units in each word organization equal to the total number of bits which can be used to form the address.

6. In a content-addressed cryogenic memory using a Lewin readout organization, an address section associated with each word organization comprising:

two digit lines, an $I_{RQ}$ line and an I line, and three word lines, a $W_s$ line, a $\overline{W}_s$ line and an $R_q$ line, said $I_{RQ}$ line branching into two sections one of which is the aforesaid $R_q$ line and the other of which is designated the $\overline{R}_q$ line, said $R_q$ line being in the form of a loop which may be considered to consist of an advance line and a spaced return line joined at the ends which are not connected to said $I_{RQ}$ line, said $W_s$ and $\overline{W}_s$ lines being spaced branches of the $I_{WS}$ line of the word organization; and three cryotrons, the first being at the crossing of the $I_{RQ}$ and $W_s$ lines with the gate being in the $I_{RQ}$ line, the second being at the crossing of the I and advance $R_q$ lines with the gate being in the I line, and the third being at the crossing of the I and $W_s$ lines with the gate being in the $W_s$ line, said I line, $W_s$ line, and second and third cryotrons forming a unit for affixing an address bit to a word organization, there being a number of such units in each word organization equal to the total number of bits which can be used to form the address.

7. In a content-addressed cryogenic memory using a Lewin readout organization and having an address section, including a *q*-bit section, associated with each word organization, an empty-bit section comprising:

an $I_D$ line and an $I_W$ line, said $I_D$ line branching into two sections, said $I_W$ line, which would be in the data-bit section of a memory not having empty-bit sections, now being moved to the empty-bit section of the word organization and branching into two sections, a W section and a $\overline{W}$ section, said W section being in the form of a loop which may be considered to consist of an advance W line and a spaced return W line joined at the ends which are not connected to said $I_W$ line; and three cryotrons, the first being at the crossing of the $I_W$ and $W_s$ (also designated $W_q$) lines with the gate being in the $I_W$ line, the second being at the crossing of one branch of the $I_D$ line and the advance W line with the gate being in the $I_D$ branch, and the third being at the crossing of said one branch of the $I_D$ line and the $W_s$ (also designated $W_q$) line with the gate being in the $W_s$ line.

8. A word organization as set forth in claim 7, further including an additional, designated the $I_{sq}$ line, line in the *q*-bit address section, and an additional cryotron located at the crossing of the $I_{sq}$ and $\overline{W}_s$ (also designated $\overline{W}_q$) line with the gate being in the $\overline{W}_s$ line.

9. In a content-addressed cryogenic memory which is separated into planes, uses a Lewin readout organization and has address bits associated with each word, a method for interconnecting planes in a way in which the plane addresses can be sequentially interrogated comprising the steps of:

forming a separate ladder-circuit structure for each plane;

using some of the address bits to permanently address each plane; and using the ladder-circuit structure to sequentially interrogate the plane address bits.

References Cited

UNITED STATES PATENTS

| | | | |
|---|---|---|---|
| 3,296,599 | 1/1967 | Davies | 340—173.1 |
| 3,311,898 | 3/1967 | Bremer et al. | 340—173.1 |

TERRELL W. FEARS, Primary Examiner

JOSEPH F. BREIMAYER, Assistant Examiner

U.S. Cl. X.R.

340—172.5